United States Patent [19]

Criglar et al.

[11] 3,944,743
[45] Mar. 16, 1976

[54] METHOD AND APPARATUS FOR FEEDBACK SUPPRESSION

[75] Inventors: John J. Criglar, Piedmont; Peter R. Pettler, San Francisco, both of Calif.

[73] Assignee: Plantronics, Inc., Santa Clara, Calif.

[22] Filed: Jan. 7, 1974

[21] Appl. No.: 431,173

[52] U.S. Cl. ............ 179/1 FS; 179/1 HF; 179/1 VC
[51] Int. Cl.² .......................................... H04M 1/20
[58] Field of Search...... 179/1 FS, 1 F, 1 VL, 1 VC, 179/81 A, 1 H, 1 HF, 170.2, 81 B, 1 P; 328/151

[56] References Cited
UNITED STATES PATENTS

| | | | |
|---|---|---|---|
| 2,568,823 | 9/1951 | Potter.............................. | 179/1 FS |
| 2,723,316 | 11/1955 | Goodell et al..................... | 179/1 FS |
| 2,980,769 | 4/1961 | Lawsine............................ | 179/1 FS |
| 3,429,999 | 2/1969 | Stover.............................. | 179/1 FS |
| 3,602,648 | 8/1971 | Holtz et al. ...................... | 179/81 A |
| 3,665,106 | 5/1972 | Parshad............................ | 179/1 FS |
| 3,794,763 | 2/1974 | Boudewijns...................... | 179/1 VC |

*Primary Examiner*—William C. Cooper
*Assistant Examiner*—Joseph Popek
*Attorney, Agent, or Firm*—Townsend and Townsend

[57] ABSTRACT

A system for suppressing positive feedback in acoustical-electrical devices having acoustic or electric feedback paths or a combination of both. Electrical signals from a microphone are transmitted through a sampling switch to a signal storage device. The transfer rate and duration are controlled by a pulse generator driven by an oscillator to time domain process the signals. The discrete signals output from the signal storage device are smoothed by a low pass filter and used to drive follow on circuitry, e.g., a speaker. A plurality of switches, signal storage devices, oscillators and pulse generators can be arranged in serial or parallel to provide various processing combinations. Several embodiments of the system are employed in a bidirectional telephone unit having separate incoming and outgoing signal channels to enable full duplex mode operation. In one embodiment, the incoming signals only are time domain processed and used to generate signals for controlling a voltage control gain block in the outgoing channel. In another embodiment, both the incoming and outgoing signals are time domain processed. In another embodiment, both the incoming and outgoing signals are time domain processed and voltage gain controlled by the signals in the opposite channel.

26 Claims, 10 Drawing Figures

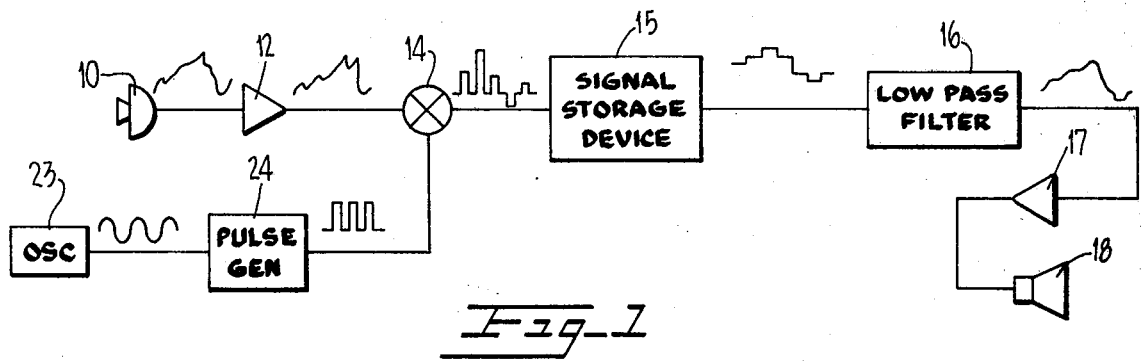
Fig_1
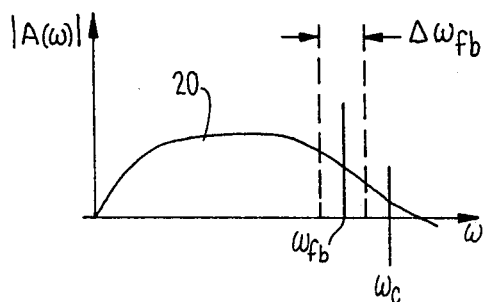
Fig_2A
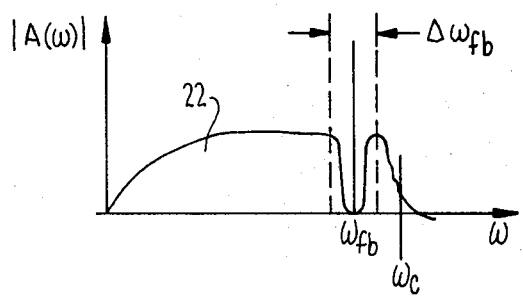
Fig_2B
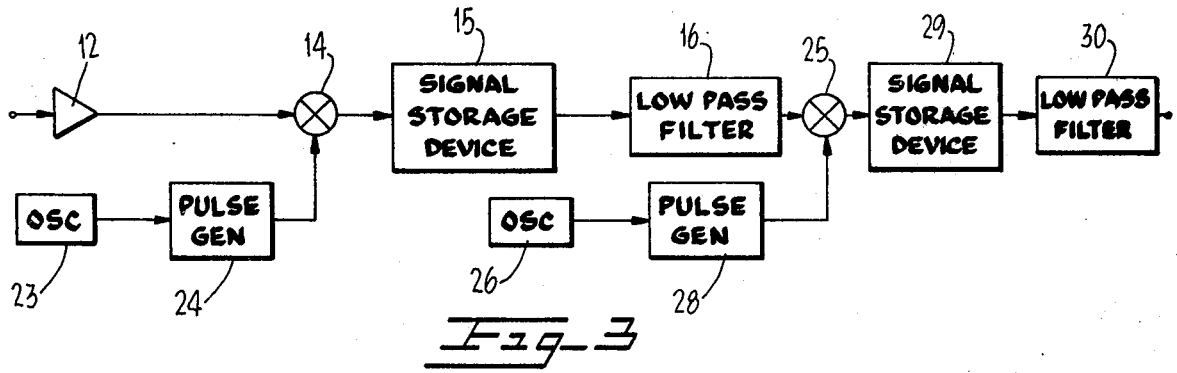
Fig_3
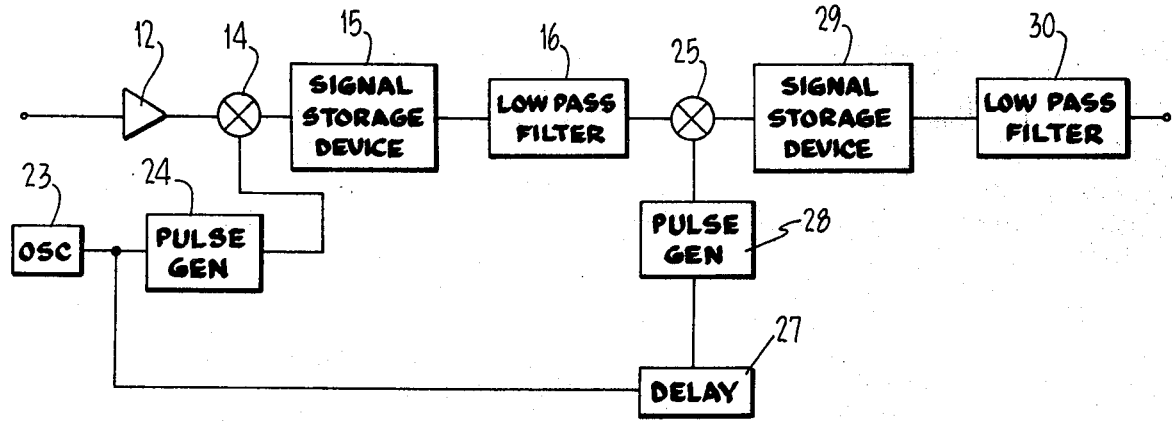
Fig_4A

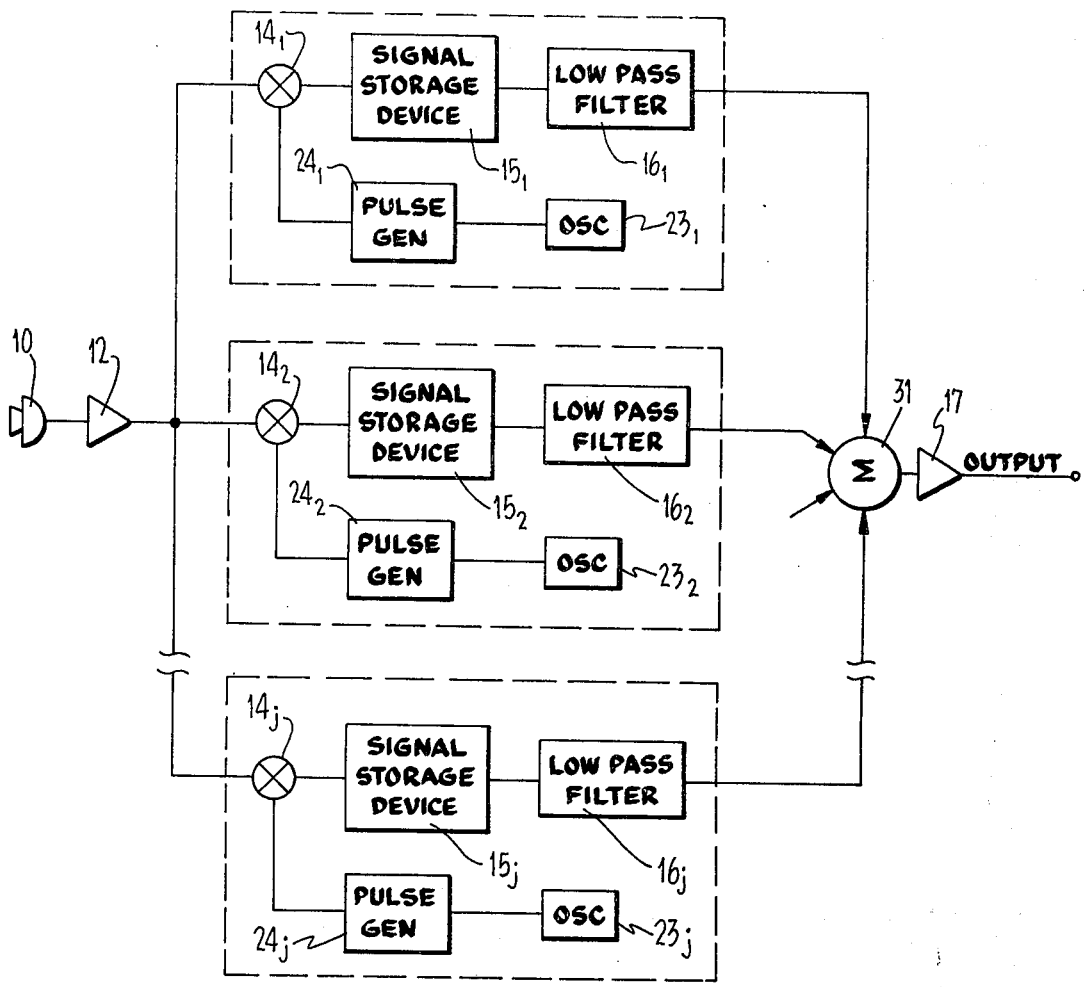
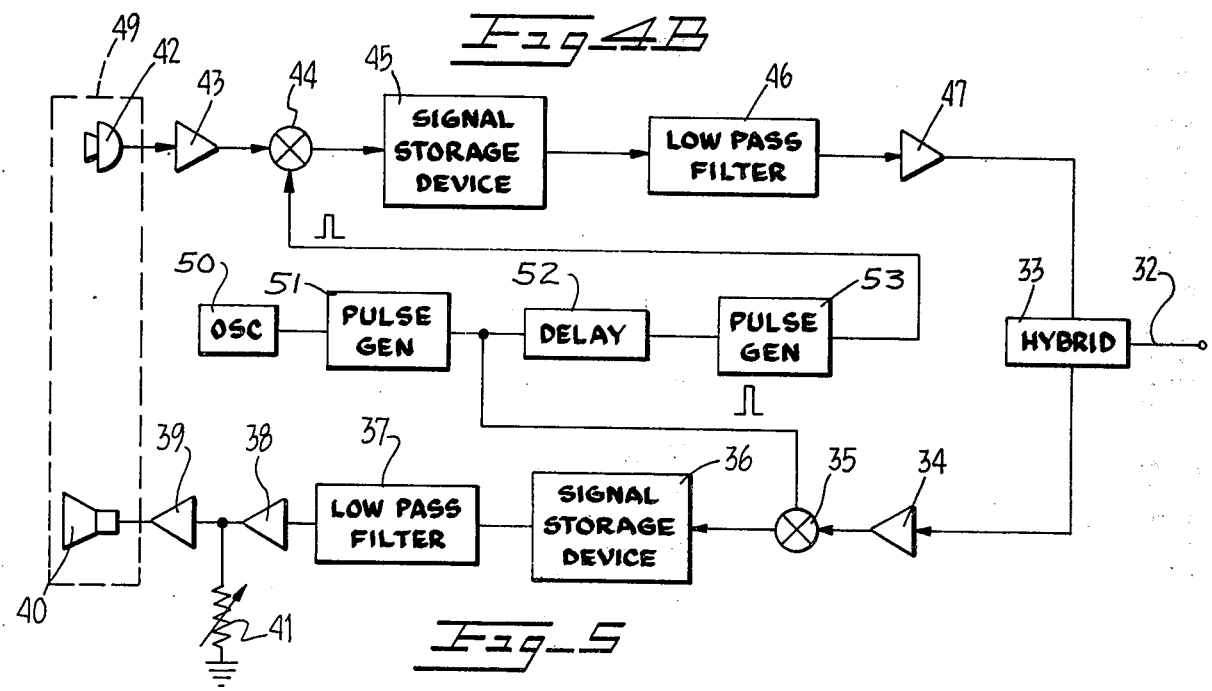
Fig 4B
Fig 5

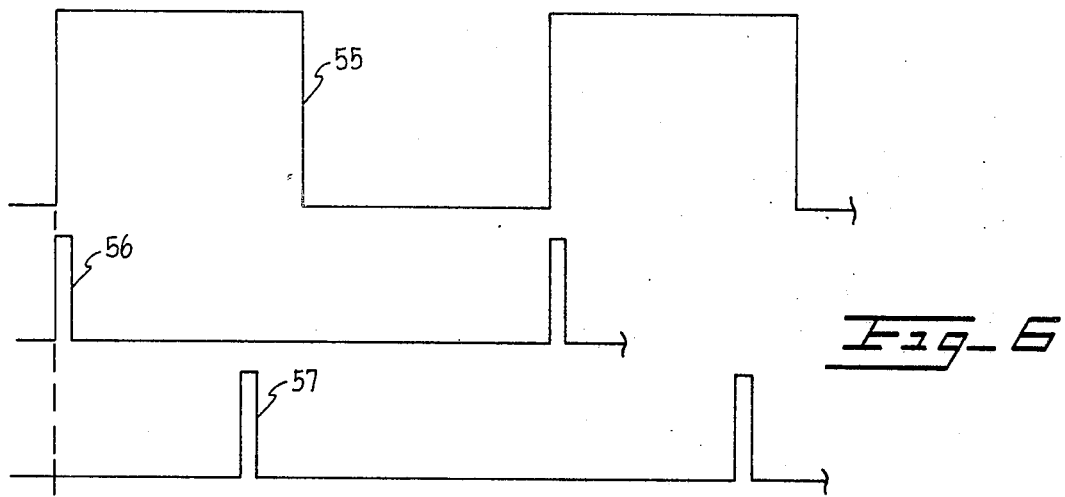
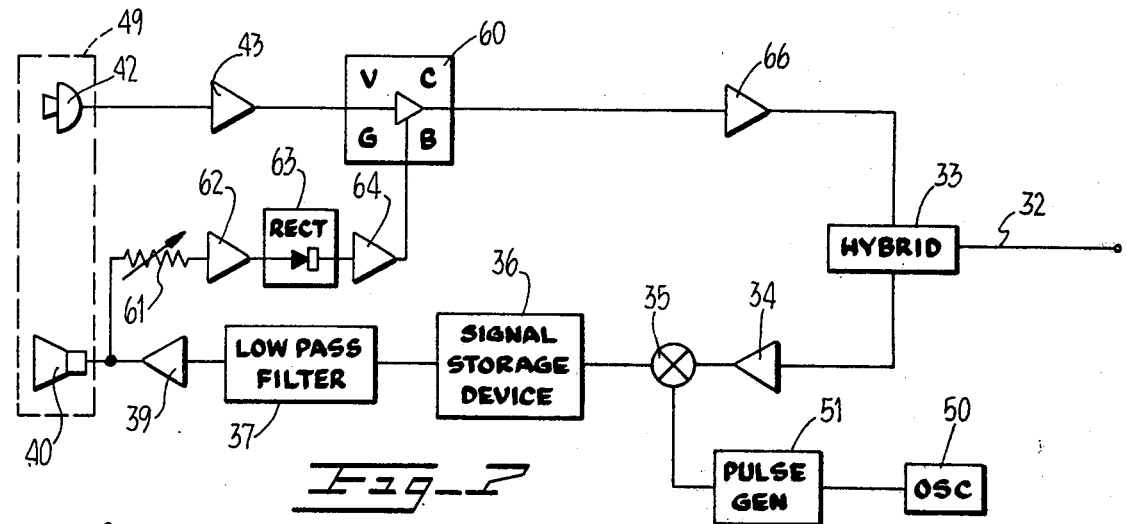
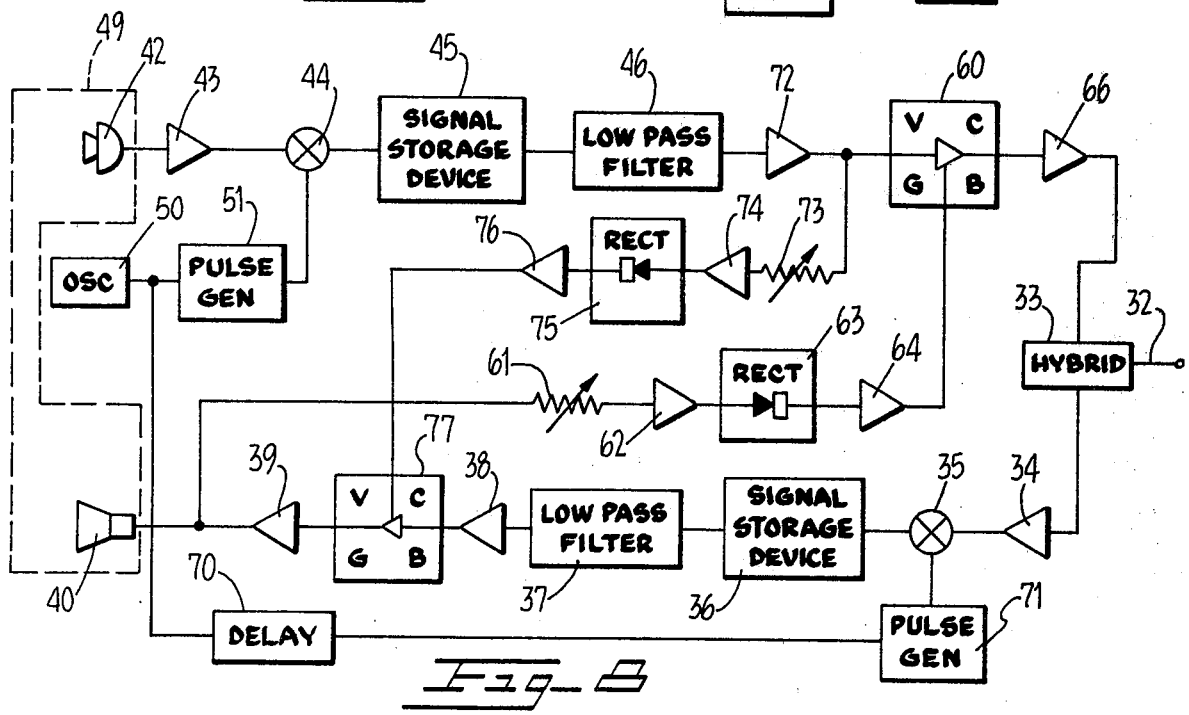

METHOD AND APPARATUS FOR FEEDBACK SUPPRESSION

BACKGROUND OF THE INVENTION

This invention relates to acoustical-electrical systems possessing parameters which permit self-oscillation induced by positive feedback. More particularly, this invention relates to systems in which provision is made to suppress this type of self-oscillation.

Many systems are known for converting voice signals, i.e., those in the audible range, to the electrical equivalent form, amplifying these electrical signals, and using these amplified signals to drive a follow on device, e.g. a loud speaker, a recording device, a telephone transmitter circuit, or the like. In known systems of this type, feedback paths typically exist which adversely affect system performance. For example, in a simple public address system, acoustical feedback paths are normally present which permit a portion of the acoustic signals emanating from the loud speaker to be coupled to the microphone. In a full duplex telephone line repeater system, on the other hand, electrical feedback paths are present which permit a portion of the amplified electrical signals to be electrically fed back to the input portion of the circuit in a closed loop. Moreover, in an amplified telephone system, having a telephone transmitter microphone and a speaker coupled to the telephone lines via a hybrid circuit, both acoustic and electrical feedback paths are present which can succeed in both acoustically and electrically coupling back signals to an input portion of the system.

In systems having either acoustic or electric feedback or a combination of both, it has been found that positive feedback occurs at those frequencies at which the phase shift of the loop is an integral multiple of 360° and at which the net system voltage gain is equal to unity, i.e., those frequencies which satisfy the Bode stability criteria. When these criteria are met, the result is a ringing or squealing signal which overrides or masks the desired signals.

Efforts to suppress such unwanted feedback, in which an amplified signal re-enters the amplifying channel to cause squeal, have centered about providing conventional frequency domain filters which attempt to eliminate or reduce the amplitude of those frequencies satisfying the Bode criteria. The insertion of a convention notch or band pass frequency filter in the amplifying channel, however, has not been found to be particularly effective since the net effect of this insertion is to increase the system phase shift at the upper band edges of the band pass frequency for which the system is designed. This has the effect of merely lowering the frequency at which positive feedback occurs, without eliminating the feedback.

SUMMARY OF THE INVENTION

The invention comprises a system and method for suppressing positive feedback in acoustical-electrical systems susceptible thereto which is extremely inexpensive to fabricate and highly reliable in operation. Broadly stated, squeal suppression is effected in accordance with the invention by time domain processing electrical signals in the audible range to remove signal components prossessing frequencies which promote positive feedback. In the simplest embodiment, amplified speech signals are coupled via a sampling switch to a signal storage device. The state of the switch is controlled by the output of a pulse generator which provides a train of switch actuation pulses each having a predetermined width. The pulse generator is driven by the output of an oscillator which provides a clock signal train having a predetermined frequency. The incoming analog electrical signals are thus discretely sampled in accordance with the oscillator frequency, with each sampling period being determined by the width of a sampling pulse. The sampling frequency and sampling interval duration are selected in such a manner that unwanted frequencies, i.e., those which promote positive feedback, are removed without substantially impairing the information content of the signals. After sampling, the signals are reconverted to smoothly varying monotonic analog form by a low pass filter, after which they are further amplified and coupled to an output device, e.g. a loud speaker.

In an alternate embodiment, the time domain processing is further improved by subjecting the input information signals to a plurality of serial or parallel time domain processing steps.

In a further specific aspect, the invention comprises a bidirectional full duplex communications unit in which positive feedback suppression is enhanced by a combination of voltage gain control and time domain processing. In a first embodiment, means are provided for time domain processing both incoming and outgoing speech signals. In another embodiment, means are provided for time domain processing the incoming speech signals and for generating signals from the incoming signals for controlling the gain of the outgoing signal amplifying channel. In still another embodiment, means are provided for time domain filtering both the incoming and outgoing speech signals and for generating control signals for controlling the gain of both the incoming and outgoing amplifying channels of the unit.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a block diagram of a first embodiment of the invention;

FIGS. 2A and B are plots of amplitude versus frequency illustrating the operation of the FIG. 1 embodiment;

FIGS. 3 and 4A and 4B illustrate alternate embodiments of the invention of FIG. 1;

FIG. 5 illustrates an alternate embodiment of the invention providing two channel time domain filtering in a bidirectional telephone unit;

FIG. 6 is a waveform diagram illustrating the operation of the FIG. 5 embodiment;

FIG. 7 illustrates another embodiment providing one channel time domain filtering and opposite channel gain control in a bidirectional telephone unit; and FIG. 8 illustrates a bidirectional telephone unit having two channel time domain filtering and cross-coupled voltage gain control.

DESCRIPTION OF THE PREFERRED EMBODIMENTS

Turning now to the drawings, FIG. 1 illustrates a first embodiment of the invention. The FIG. 1 system comprises a sound amplification circuit modified in accordance with the teachings of the invention to provide squeal suppression. In the ensuing description of the FIG. 1 embodiment, as well as the other embodiments illustrated in FIGS. 3–5, 7 and 8, conventional well-known individual elements employed are identified in block diagram form. Since the circuit details of such well-known elements can be readily supplied by those skilled in the art, further details thereof have been omitted to avoid prolixity.

In the FIG. 1 embodiment, a conventional microphone 10 for converting speech signals or other signals lying in the audible range is coupled to the input of a preamplifier 12. Preamplifier 12 voltage amplifies the signals input thereto and may be provided with frequency shaping networks as appropriate to compensate for any undesired frequency response characteristics of the microphone 10. The output of preamplifier 12 is coupled to the transfer input of a switch 14 which is preferably an electronic switch such as a field effect transistor configured as a transfer switch. The transfer output of switch 14 is coupled to the input of a signal storage device 15, which is a conventional unit, e.g. a capacitor, capable of assuming the value of the sampled signal input thereto and holding this value until the next succeeding sample is applied thereto. The output of signal storage device 15 is coupled to the input of a low pass filter 16, which is designed to have pass band characteristics contributing to the desired system response. The output of low pass filter 16 is coupled to the input of a power amplifier 17, which provides power amplification to the signals input thereto. The output of power amplifier 17 is coupled to a conventional speaker 18 which converts the amplified electrical signals to audible form.

As will be apparent to those skilled in the art, in the sound amplification system of FIG. 1, an acoustic feedback channel exists between speaker 18 and microphone 10. Absent any provision for suppression, the positive feedback provided by this channel ordinarily would cause self-oscillation of the system. FIG. 2A illustrates the frequency response of a typical system of the FIG. 1 type, exclusive of elements 14, 15 described above and elements 23, 24 described below. As shown in this FIG., the response curve 20 extends from nominal zero to an upper cut-off frequency $\omega_c$. Lying within the pass band of curve 20 is a range of frequencies $\Delta\omega_{fb}$ centered about a frequency $\omega_{fb}$ at which positive feedback would normally occur.

In order to remove these undesired frequency components from signals passing through the system, the signals are processed in the following manner. With reference to FIG. 1, a conventional oscillator 23 generates a periodic signal of a fixed frequency, which may be a sine wave as illustrated, a square wave, or the like. The fixed frequency output signal from oscillator 23 is coupled to the input of a pulse generator 24. Pulse generator 24 is a conventional circuit which generates a train of sharply defined pulses each having a fixed width in response to the receipt of recurring portions of the periodic signal input thereto. The output of pulse generator 24 is coupled to the control input of electronic switch 14 to permit the transfer of the signal present at the transfer input to the signal storage device 15 for the duration of a sampling pulse. Thus, in operation, the continuous analog signals output from preamplifier 12 are discretely sampled by controlled the state of switch 14. By proper selection of the sampling frequency, which is determined by the frequency of the output signal from oscillator 23, and the sampling interval, which is determined by the width of the pulse signals output from pulse generator 24, the frequency components of the signal output from preamplifier 12 which promote positive feedback oscillation are thus removed without introducing noticeable distortion to the desired information content of the signals. After this time domain processing, the signals are reconverted to smoothly varying analog form by low pass filter 16 and coupled to the output portions of the system. FIG. 2B illustrates the effect of the time domain processing on the response characteristics of the system of FIG. 1. As is evident from this Fig., the altered response curve 21 has a notch substantially centered about $\omega_{fb}$. This notch removes substantially all those frequency components $\omega_{fb}$ of the input signal and reduces the amplitude of frequency components other than $\omega_{fb}$ lying in the range $\Delta\omega_{fb}$ below that required to sustain system oscillation.

Since the frequency components promoting positive feedback typically vary as a function of system parameters which are not always convenient to calculate or measure, it has been found preferable to employ a variable frequency oscillator 23 and an adjustable pulse generator 24 in a given application. After the microphone 10 and speaker 18 have been installed, oscillator 23 and pulse generator 24 can then be manually adjusted to empirically select that sampling frequency and sampling interval which provide optimum time domain processing to the particular system. In actual practice, it has been found that once a system has been empirically adjusted for a given microphone-speaker configuration, the placement of these two elements can be varied to a great extent without adversely affecting the performance of the system.

In some applications, it has been found that optimum results may be obtained by providing additional time domain processing in a serial fashion to the sound signals. FIG. 3 illustrates an embodiment of the invention for accomplishing this result. In this Fig. as well as in succeeding Figs., like elements are designated by the same reference numeral. Thus, in the FIG. 3 embodiment, the output signals from preamplifier 12 are subjected to a first time domain processing by oscillator 23, pulse generator 24, switch 14 and signal storage device 15, and thereafter are passed through low pass filter 16 to the transfer input of a second electrical switch 25. The state of second electrical switch 25 is controlled by a second pulse generator 28 driven by a second oscillator 26. In a similar manner to that discussed above with reference to elements 14, 23, and 24, sampled portions of the signals from low pass filter 16 are coupled to a second signal storage device 29 at a frequency determined by the frequency of the output signals from second oscillator 26 and for a sampling period determined by the period of the individual output pulses from second pulse generator 28. The output of second signal storage device 29 is coupled to the input of a low pass filter 30 in which the discrete sampled signals are converted to smoothly varying analog form. The output of low pass filter 30 is then coupled to appropriate follow on electrical circuitry, such as amplifier 17 and loud speaker 18 of FIG. 1.

FIG. 4A illustrates a variation of the system of FIG. 3 in which the output signals from preamplifier 12 are subjected to a first time domain processing by elements 14, 15, 23 and 24 and to a second time domain processing by elements 25, 28 and 29. In this embodiment, however, a delay element 27, is coupled between a single oscillator 23 and a second pulse generator 28. Preferably, the delay provided by delay element 27 is variable so that the phase of the pulse train output from second pulse generator 28 may be adjusted manually to provide optimum system response. If desired, additional stages may be added onto the FIG. 3 embodiment in order to provide a plurality of individual time domain processing units all operating at the same or different frequencies and sampling intervals on the output signals from preamplifier 12.

FIG. 4B illustrates another variation of the system of FIG. 3 in which the output signals from preamplifier 12 are time domain processed in a plurality of parallel time domain processing units. As shown in this Fig., the individual time domain processing units each include a transfer switch $14_i$, a signal storage device $15_i$, a low pass filter $16_i$, an oscillator $23_i$ and a pulse generator $24_i$. As noted above in the discussion of the embodiment of FIG. 1, individual oscillators $23_i$ and pulse generators $24_i$ may be fixed or variable, depending on the requirements of a given application. The output from each of the individual low pass filters $16_i$ are coupled to a conventional summing network 31, the output of which is coupled to the input of amplifier 17.

If desired, a multiplicity of microphones 10, or speakers 18, or both may be employed in the several embodiments. For example, in the FIG. 1 embodiment, a plurality of microphones 10 may be used in place of the single microphone shown as an input to the system. In such an application, the individual microphones 10 would be coupled to a conventional mixer unit, the output of which would be coupled to the input of preamplifier 12. If desired, the mixer may be provided with individual loudness or gain control adjusting devices to provide the proper mix of input signals. Further, power amplifier 17 may be output to a plurality of speaker units 18. In such a case, proper balancing circuits designed in accordance with known techniques may be interposed therebetween. If desired, the individual loud speaker unit can be provided with individually adjustable loudness control circuits in order to enable adjustment of the sound distribution.

FIG. 5 illustrates an embodimemt of the invention found particularly suitable for use as a bidirectional telephone unit. In this embodiments, incoming speech signals from a conventional two conductor telephone line 32 are coupled to a conventional telephone hybrid circuit 33. Hybrid circuit 33 may be a circuit of the type disclosed in "Magnetic Circuits and Transformers", J. Wiley and Sons, pages 519-525, May 1952, the disclosure of which is hereby incorporated by reference. The output from hybrid circuit 33 is coupled to a preamplifier 34. Preamplifier 34 may be provided, if desired, with appropriate conventional signal shaping circuits for the incoming speech signals. The output of preamplifier 34 is coupled to the transfer input of an electronic switch 35. The transfer output of switch 35 is coupled to the input of a signal storage device 36. The output of signal storage device 36 is coupled to the input of a conventional low pass filter 37 which drives a preamplifier 38. The output of preamplifier 38 is coupled to the input of a power amplifier 39 which in turn is used to drive a conventional speaker 40 mounted in the console unit of the user. An optional volume control element 41 is coupled between amplifiers 38, 39.

The outgoing channel of the telephone unit shown in FIG. 5 is similar to the above described input channel and includes a conventional microphone unit 42 which is coupled to the input of a preamplifier 43, the output of which is coupled to the transfer input of a switch 44. The transfer output of switch 44 is coupled to a second signal storage device 45. The output of signal storage device 45 is coupled via a low pass filter 46 to the input of a power amplifier 47. Power amplifier 47 is coupled to the hybrid unit 33 which couples the speech signals input thereto to telephone lines 32 in an outoing mode. As indicated by broken line 49, speaker 40 and microphone unit 42 may be housed in a single desk console unit.

The signals in both the incoming and the outgoing channels in the FIG. 5 embodiment are time domain processed in the following fashion. A single oscillator 50 providing an output signal train of a predetermined frequency is coupled to the input of a first pulse generator 51. Pulse generator 51 provides output signals having a predetermined pulse width which are coupled to the first transfer switch 35 to control the sampling of the incoming signals presented at the transfer input thereto by preamplifier 34. The output signals from first pulse generator 51 are coupled via a delay element 52 to the input of a second pulse generator 53. The output of second pulse generator 53 is a second train of pulses having a second predetermined width and phase relationship to the pulse train output from first pulse generator 51 which is determined by delay element 52. The output of pulse generator 53 is used to control the operation of second transfer switch 44.

FIG. 6 illustrates typical waveforms present in the circuit of FIG. 5. Square wave train 55 is representative of the periodic waveform output of oscillator 50. Waveform 56 represents the output pulse train from pulse generator 51. As is evident from the Fig., first pulse generator 51 produces a pulse train output signal having leading edges substantially coincident with the leading edges of the clock train waveform 55 and having a width substantially narrower than the period of waveform 55. Waveform 57 represents the output of second pulse generator 53. As a comparison of the two pulse generator output waveforms shows, the second pulse train 57 comprises a series of regularly spaced rectangular pulses substantially identical to the pulses of pulse train 56 from first pulse generator 51, but delayed by an appropriate delay interval provided by delay element 52.

As noted above, the sampling frequency provided by the signal output from oscillator 50 can be determined in an empirical manner by employing an adjustable oscillator 50. Likewise, the optimum width of the first and second pulse output trains, as well as the optimum delay interval between the first and second pulse trains may also be empirically determined by employing pulse generators having a pulse width adjustment and control and an adjustable delay unit 52. In practice, it has been found that the characteristic frequencies provided by particular geometric configurations of speaker 40 and microphone 42 in a conventional housing, as well as the electrical feedback characteristics provided by hybrid circuit 33, are substantially invariant for similar production units. Thus, once the optimum sampling frequency sampling interval duration, and delay period have been ascertained, oscillator 50, pulse generators 51 and 53 and delay element 52 may be replaced by fixed elements if desired.

FIG. 7 illustrates another embodiment of the invention suitable for use as a bidirectional telephone unit, in which signals in the incoming channel are given priority over those in the outgoing channel. In this embodiment, only the signals in the incoming channel are time domain processed and the processed signals are used to derive control signals for a voltage control gain block 60 inserted to the outgoing channel. In the FIG. 7 embodiment, the output of power amplifier 39 is coupled through a variable resistance 61 to the input of a buffer amplifier 62. The output of buffer amplifier 62 is coupled to a rectifier 63 which develops the envelope of the time domain processed incoming signal. The output of rectifier 63 is coupled via a DC amplifier 64 to the control input of a conventional voltage control gain block 60, this latter element comprising an amplifier capable of providing continuously variable gain in the outgoing signal channel over a predetermined range in response to the control signals input thereto. The output of voltage control gain block 60 is coupled to the input of an amplifier 66, the output of which is coupled to hybrid circuit 33. Amplifier 66 may comprise a conventional power amplifier or a self gain controlled amplifier. The latter type of amplifier may be employed for the purpose of preventing hybrid circuit 33 from overdriving telephone lines 32 and also to assist in maintaining the signal amplitude within a desired amplitude range.

As noted above, the system of FIG. 7 establishes priority for incoming speech signals. This is accomplished by enabling the incoming speech signals to control the gain of the outgoing channel via elements 60-64. As illustrated, the gain control signals are obtained from the time domain processed incoming speech signals. However, if desired, the incoming speech signals may bypass the time domain processing portions of the circuit to directly control the gain of voltage control gain block 60.

FIG. 8 illustrates still another embodiment of the invention suitable for use with a bidirectional telephone unit in which both the incoming and outgoing channels are provided with time domain processing units and also in which each channel is gain controlled in accordance with the level of the signal in the other channel.

In this embodiment, oscillator 50 and pulse generator 51 are used to drive transfer switch 44 in the outgoing channel of the telephone unit, while oscillator 50, a delay unit 70 and pulse generator 71 are used to control transfer switch 35 in the incoming channel of the unit. In addition, and additional amplifier 72 is coupled between low pass filter 46 and voltage control gain block 60. The output of amplifier 72 is also coupled to a second gain control branch comprising variable resistor 73, buffer amplifier 74, rectifier 75 and DC amplifier 76. The latter elements provide control signals to a second voltage control gain block 77 inserted in the incoming channel between amplifiers 38, 39. The FIG. 8 arrangement thus provides cross-coupled voltage gain control of both channels as well as independent time domain processing for both the incoming and outgoing signals.

As noted above, the optimum sampling frequencies and sampling intervals for any given application can best be determined on an empirical basis. For example, in one application of a system of the FIG. 7 type designed with a pass band range from 30 to 3,000 hertz, a sampling frequency of 15 kilohertz and a sampling interval of two microseconds was found to povide an increase of gain margin in excess of 18 decibels with substantial squeal suppression. The embodiment of FIG. 8 has demonstrated squeal reduction performance of an even greater magnitude with similar sampling parameters and a delay interval of 25 microseconds.

The invention described above may be employed in a wide variety of applications with beneficial results. In addition to sound amplification systems, and bidirectional telephone units, the teachings of the invention may be applied to sound re-enforcement systems, amplified hearing aids, radio/telephone systems, amplified intercommunications systems, amplified noise cancelling systems, sound on sound recording systems, and other systems possessing inherent susceptibility to audio feedback resulting from either acoustic feedback into a microphone from a speaker or electrical feedback between an incoming signal channel and an outgoing signal channel.

When applied to bidirectional telephone systems, the invention permits one or more such units to operate in the full duplex mode rather than the voice switched mode commonly employed in commercially available units. In voice switched systems, speech signals are only transmitted at any given time in one direction, with the direction being determined by the party talking the loudest. The full duplex mode of operation, on the other hand, offers the decided advantage that one or more parties stationed at both ends of the telephone line may simultaneously converse from station to station with no loss of information content. The same principle may be applied to the field of radio telephony to provide full duplex mode of operation.

While the above provides a full and complete disclosure of the preferred embodiments of the invention, various modifications, alternate constructions, and equivalents may be employed without departing from the spirit and scope of the invention. Therefore, the above description and illustrations should not be construed as limiting the scope of the invention which is defined by the appended claims.

What is claimed is:

1. A method for suppressing positive feedback in a sound amplifying system, said method comprising the steps of:
   a. generating variable amplitude electrical signals representative of acoustical signals lying in the audible range;
   b. time domain processing said electrical signals to attenutate preselected frequency components which promote said positive feedback; and
   c. reconverting said processed signals to signals having a smoothly varying amplitude form.

2. The method of claim 1 wherein said step of time domain processing includes the steps of:
   i. coupling said variable amplitude electrical signals to the transfer input of a signal transfer device;
   ii. generating a train of sample pulses having a predetermined width and a predetermined frequency;
   iii. applying said train of sample pulses to the control input of said signal transfer device to permit the transmission therethrough of discrete samples of the signals present at the transfer input thereof; and
   iv. coupling said discrete samples from said signal transfer device to a signal storage device.

3. The method of claim 2 wherein said step of time domain processing further includes the steps of:
   v. reconverting the signals output from said signal storage device to a smoothly variable amplitude form;

vi. applying said reconverted signals to the transfer input of a second signal transfer device;
vii. generating a second sample pulse train;
viii. applying said second sample pulse train to the control input of said second signal transfer device; and
ix. coupling said signals from said second signal transfer device to the input of a second signal storage device.

4. The method of claim 3 further including the step of adjusting the phase of said second sample pulse train relative to said first sample pulse train.

5. The method of claim 1 wherein said step of time domain processing includes the steps of:
i. substantially simultaneously applying said variable amplitude electrical signal to the individual transfer inputs of a plurality of signal transfer devices;
ii. generating a corresponding plurality of trains of sample pulses each having a predetermined width and a predetermined frequency;
iii. applying said plurality of trains of sample pulses to the control inputs of different ones of said plurality of signal transfer devices to permit the transfer therethrough of discrete samples of the signals present at the transfer inputs thereof; and
iv. coupling said discrete samples from each of said plurality of signal transfer devices to a different one of a plurality of signal storage devices.

6. The method of claim 5 wherein said step (c) of reconverting includes the steps of:
v. passing the individual output signals from said plurality of signal storage devices through different ones of a plurality of frequency domain filter; and
vi. summing the signals output from said plurality of frequency domain filters.

7. A method for suppressing positive feedback in a bidirectional communications unit having an incoming channel and an outgoing channel commonly coupled to a bidirectional coupling device and a voltage control gain block in one of said channels, said method comprising the steps of:
a. time domain processing variable amplitude electrical signals in the other of said channels to attenuate preselected frequency components which promote said positive feedback;
b. reconverting the signals resulting from step (a) to signals having a smoothly varying amplitude form;
c. generating gain control signals from said signals in said other of said channels; and
d. coupling said gain control signals to said voltage control gain block in said one of said channels to control the gain thereof.

8. The method of claim 7 wherein said step (a) of time domain processing includes the steps of:
i. coupling said variable amplitude electrical signals in said other one of said channels to the transfer input of a signal transfer device;
ii. generating a train of sample pulses having a predetermined width and a predetermined frequency;
iii. applying said train of sample pulses to the control input of said signal transfer device to permit the transmission therethrough of discrete samples of the signals present at the transfer input thereof; and
iv. coupling said discrete samples from said signal transfer device to a signal storage device.

9. A method for suppressing positive feedback in a bidirectional communications unit having an incoming channel and an outgoing channel commonly coupled to a bidirectional coupling device, said method comprising the steps of:
a. time domain processing variable amplitude electrical signals in said incoming channel to attenuate preselected frequency components which promote said positive feedback;
b. reconverting the signals resulting from step (a) to signals having a smoothly varying amplitude form;
c. time domain processing variable amplitude electrical signals in said outgoing channel to attentuate preselected frequency components which promote said positive feedback; and
d. reconverting the signals resulting from step (c) to signals having a smoothly varying amplitude form.

10. The method of claim 9 wherein said steps (a) and (c) include the steps of:
i. coupling said variable amplitude electrical signals in said incoming and outgoing channels to the transfer inputs of first and second signal transfer devices, respectively;
ii. generating first and second trains of sample pulses having a predetermined width and a predetermined frequency;
iii. applying said first and second trains of sample pulses to the control inputs of said first and second signal transfer devices, respectively, to permit the transmission therethrough of discrete samples of the signals present at the transfer inputs thereof; and
iv. coupling said discrete samples from said first and second signal transfer devices to first and second signal storage devices in said incoming and outgoing channels, respectively.

11. The method of claim 9 wherein said incoming and outgoing channels are each provided with a voltage control gain block and further including the steps of:
e. generating a first gain control signal from the variable amplitude signals present in said incoming channel;
f. generating a second gain control signal from the variable amplitude signals present in said outgoing channel;
g. coupling said first gain control signal to the voltage control gain block in said outgoing channel to control the gain thereof; and
h. coupling said second gain control signal to said voltage control gain block in said incoming channel to control the gain thereof.

12. A sound amplification system having positive feedback suppression, said system comprising:
a. means for generating variable amplitude electrical signals representative of acoustical signals lying in the audible range;
b. means for time domain processing said electrical signals to attenuate therefrom preselected frequency components which promote positive feedback; and
c. means for reconverting said processed signals to signals having a smoothly varying amplitude form.

13. The system of claim 12 wherein said means for time domain processing includes a signal transfer device having a transfer input, a transfer output and a control input; means for coupling said variable amplitude electrical signals to said transfer input of said signal transfer device; means for generating a train of sample pulses having a predetermined width and a predetermined frequency; means for coupling said train of sample pulses to said control input of said signal transfer device to permit the transmission therethrough of discrete samples of the signals present at said transfer input; a signal storage device; and means for coupling said discrete samples from said signal transfer device to said signal storage device.

14. The system of claim 13 wherein said means for time domain processing further includes means for reconverting the signals output from said signal storage device to a smoothly varying amplitude form; a second signal transfer device having a transfer input, a transfer output, and a control input; means for coupling said reconverted signals to said transfer input of said second signal transfer device; means for generating a second train of sample pulses having a predetermined width and a predetermined frequency; means for coupling said second sample pulse train to said control input of said second signal transfer device to permit the transmission therethrough of discrete samples of the signals present at the transfer input thereof; a second signal storage device; and means for coupling said discrete samples from said second signal transfer device to said second signal storage device.

15. The system of claim 14 wherein said time domain processing means further includes means coupled to said second sample pulse train generating means for adjusting the phase of said second sample pulse train relative to said first sample pulse train.

16. The system of claim 12 wherein said time domain processing means includes a plurality of signal transfer devices each having a transfer input, a transfer output, and a control input means for generating a corresponding plurality of trains of sample pulses each having a predetermined width and a predetermined frequency; means for coupling each of said plurality of trains of sample pulses to the control inputs of different ones of said plurality of said signal transfer devices to permit the transfer therethrough of discrete samples of the signals present at the transfer inputs thereof; a corresponding plurality of signal storage devices; and means for coupling said discrete samples from each of said plurality of signal transfer devices to a different one of said plurality of signal storage devices.

17. The system of claim 16 wherein said reconverting means includes a plurality of frequency domain filters each having an input and an output; means for coupling the individual output signals from said plurality of signal storage devices to the input of different ones of said plurality of frequency domain filters; and summing means coupled to the output of said plurality of frequency domain filters for algebraically summing the signals output therefrom.

18. A bidirectional communications unit operable in full duplex mode and having position feedback suppression, said unit comprising:
 a. a bidirectional coupling device providing an input/output signal port for said communications unit;
 b. an incoming signal amplifying channel for amplifying incoming variable amplitude signals coupled thereto from said coupling device, said incoming signal amplifier channel including means for time domain processing said variable amplitude signals to attenuate preselected frequency components which promote positive feedback and means for reconverting the time domain processed signals to signals having a smoothly varying amplitude form;
 c. an outgoing signal amplifier channel for amplifying variable amplitude signal representative of acoustic signals lying in the audible range, said output signal amplifier channel including a voltage gain block having a signal input, a signal output coupled to said coupling device, and a gain control input; and
 d. means having an input coupled to said incoming signal amplifier channel for generating gain control signals from signals in said incoming signal amplifying channel and an output coupled to said gain control input of said voltage control gain block.

19. The combination of claim 18 wherein said time domain processing means includes a signal transfer device having an input for receiving said incoming variable amplitude signals, a transfer output and a control input; means for generating a train of sample pulses having a predetermined width and a predetermined frequency; means for coupling said train of sample pulses to said control input of said signal transfer device to permit the transmission therethrough of discrete samples of the incoming signals present at the transfer input thereof; a signal storage device having an input and an output; and means for coupling said discrete samples from said transfer output of said signal transfer device to said input of said signal storage device.

20. The combination of claim 18 wherein said communications unit comprises a device selected from a group consisting of a telephone unit, a radio/telephone unit, and an intercom unit.

21. The combination of claim 18 wherein said communications unit comprises a telephone unit and said coupling device comprises a telephone hybrid circuit.

22. A bidirectional full duplex communications unit having positive feedback suppression, said unit comprising:
 a. a bidirectional coupling device providing an input/output signal port for said communications unit;
 b. an incoming signal amplifier channel for amplifying incoming variable amplitude signals coupled thereto from said coupling device, said incoming signal amplifier channel including first means for time domain processing said incoming signals to attenuate therefrom preselected frequency components which promote positive feedback; and
 c. an outgoing signal amplifier channel for amplifying variable amplitude signals representative of acoustic signals lying in the audible range, said outgoing signal amplifier channel including second means for time domain processing said outgoing signals to attenuate preselected frequency components therefrom;
 said incoming and said outgoing signal amplifier channels each including means for reconverting the signals from said first and second means, respectively, to signals having a smoothly varying amplitude form.

23. The combination of claim 22 wherein said first and second time domain processing means each comprises a signal transfer device having a transfer input, a transfer output, ad a control input; means for generating first and second trains of sample pulses having a predetermined width and a predetermined frequency; means for coupling said first and second trains of sample pulses to said control inputs of said first and second signal transfer devices, respectively, to permit the transmission therethrough of discrete samples of said incoming and said outgoing signals present at said transfer inputs thereof; first and second signals storage devices in said incoming and said outgoing channels, respectively, each said signal device having an input and an output; and means for coupling said discrete samples from said first and second signal transfer devices to said inputs of said first and second signal storage devices, respectively.

24. The combination of claim 23 wherein said incoming and said outgoing signal amplifier channels each include a voltage control gain block having a signal input, a signal output, and a control signal input; first and second means for generating first and second gain control signals from said incoming and said outgoing signals, respectively; means for coupling said first gain control signal to said control signal input of said second voltage control gain block in said outgoing channel; and means for coupling said second gain control signal to said control signal input of said voltage control gain block in said incoming channel.

25. The combination of claim 22 wherein said communications unit comprises a device selected from the group consisting of a telephone unit, a radio/telephone unit, and an intercom unit.

26. The combination of claim 22 wherein said communications unit comprises a telephone unit and said coupling device comprises a telephone hybird circuit.

* * * * *